(12) United States Patent
Cheng

(10) Patent No.: US 7,516,991 B1
(45) Date of Patent: Apr. 14, 2009

(54) PIPEWORK WITH A FASTENING DEVICE

(75) Inventor: Ming-Chung Cheng, Taichung (TW)

(73) Assignee: Donell Optronics Co., Ltd., Taichung (TW)

( * ) Notice: Subject to any disclaimer, the term of this patent is extended or adjusted under 35 U.S.C. 154(b) by 0 days.

(21) Appl. No.: 12/154,258

(22) Filed: May 20, 2008

(51) Int. Cl.
*F16L 37/12* (2006.01)
*F16B 35/00* (2006.01)

(52) U.S. Cl. .................. 285/404; 403/362; 411/393
(58) Field of Classification Search .............. 285/90, 285/404; 411/393; 403/362
See application file for complete search history.

(56) References Cited

U.S. PATENT DOCUMENTS

| | | | | |
|---|---|---|---|---|
| 2,503,738 A * | 4/1950 | Horton | .................. | 403/362 |
| 3,479,072 A * | 11/1969 | Kasar | .................. | 403/276 |
| 3,501,993 A * | 3/1970 | Swenson | .................. | 411/393 |
| 3,606,393 A * | 9/1971 | Huntsinger et al. | .......... | 285/90 |
| 3,844,127 A * | 10/1974 | Koop et al. | .................. | 405/197 |
| 3,885,818 A * | 5/1975 | Ammann | .................. | 285/31 |
| 3,941,410 A * | 3/1976 | Miyaoka | .................. | 285/321 |
| 4,610,517 A * | 9/1986 | Fukino et al. | .............. | 359/611 |
| 4,907,828 A * | 3/1990 | Chang | .................. | 285/24 |
| 5,149,143 A * | 9/1992 | Howell | .................. | 285/18 |
| 5,813,809 A * | 9/1998 | Russum | .................. | 411/437 |
| 5,863,035 A * | 1/1999 | Howell | .................. | 269/246 |
| 6,322,273 B1 * | 11/2001 | Gentile, Jr. | .................. | 403/2 |
| 6,328,343 B1 * | 12/2001 | Hosie et al. | .................. | 285/90 |
| 6,739,631 B2 * | 5/2004 | Smith et al. | .............. | 285/337 |
| 6,960,212 B2 * | 11/2005 | Richelsoph et al. | ........ | 403/342 |
| 2003/0047946 A1 * | 3/2003 | Ohanesian | .................. | 285/404 |

* cited by examiner

*Primary Examiner*—James M Hewitt
(74) *Attorney, Agent, or Firm*—Charles E. Baxley

(57) ABSTRACT

A pipework has an outer pipe, an inner pipe a position hole, a pressing element and a bolt. The outer pipe has an outer wall. The inner pipe is slidably mounted in the outer pipe. The position hole is formed through the outer wall of the outer pipe and has an inner thread and at least one locating slot. The pressing element is mounted in the position hole and has a mounting recess and at least one locating block formed on and protruding from the pressing element. The blot is connected to the pressing element, is screwed with the position hole and has a body and a mounting head. The body is mounted in the position hole and has a mounting segment and an operating segment. The mounting head is formed on the mounting segment and is mounted rotatably in the mounting recess.

9 Claims, 6 Drawing Sheets

PIPEWORK WITH A FASTENING DEVICE

BACKGROUND OF THE INVENTION

1. Field of the Invention

The present invention relates to a pipework, and more particularly to a pipework with a fastening device to prevent the fastening device from damaging the pipework.

2. Description of Related Art

With reference to FIG. 8, a conventional fastening device (70) for a pipework has an outer pipe (61), an inner pipe (60), a threaded hole (71) and a bolt (72). The inner pipe (60) is slidably mounted in the outer pipe (61). The threaded hole (71) is formed through an outer wall of the outer pipe (71). The bolt (72) is screwed into the threaded hole (71) and has a distal end pressing against an external surface of the inner pipe (60) to hold the inner pipe (60) at a position relative to the outer pipe (61).

However, the pressing force of the bolt (72) may damage the external surface of the inner pipe (60), and the bolt (72) cannot hold the inner pipe (60) firmly with the damaged external surface of the inner pipe (60). Then, to change a new inner pipe (60) is needed, but this will increase the cost of using the pipework.

To overcome the shortcomings, the present invention tends to provide a pipework to mitigate the aforementioned problems.

SUMMARY OF THE INVENTION

The main objective of the present invention is to provide a pipework with a fastening device to prevent the fastening device from damaging the pipework.

The pipework in accordance with the present invention has an outer pipe, an inner pipe, a position hole, a pressing element and a bolt. The position hole is formed through an outer wall of the outer pipe and has an inner thread and at least one locating slot. The pressing element is mounted in the position hole and has a mounting recess and at least one locating block formed on and protruding from the pressing element and being mounted respectively in the at least one locating slot. The blot is connected to the pressing element, is screwed with the position hole and has a body and a mounting head. The body is mounted in the position hole and has a mounting segment and an operating segment. The mounting head is formed on the mounting segment and is mounted rotatably in the mounting recess of the pressing element.

Other objects, advantages and novel features of the invention will become more apparent from the following detailed description when taken in conjunction with the accompanying drawings.

DETAILED DESCRIPTION OF THE PREFERRED EMBODIMENT

Figure 1:
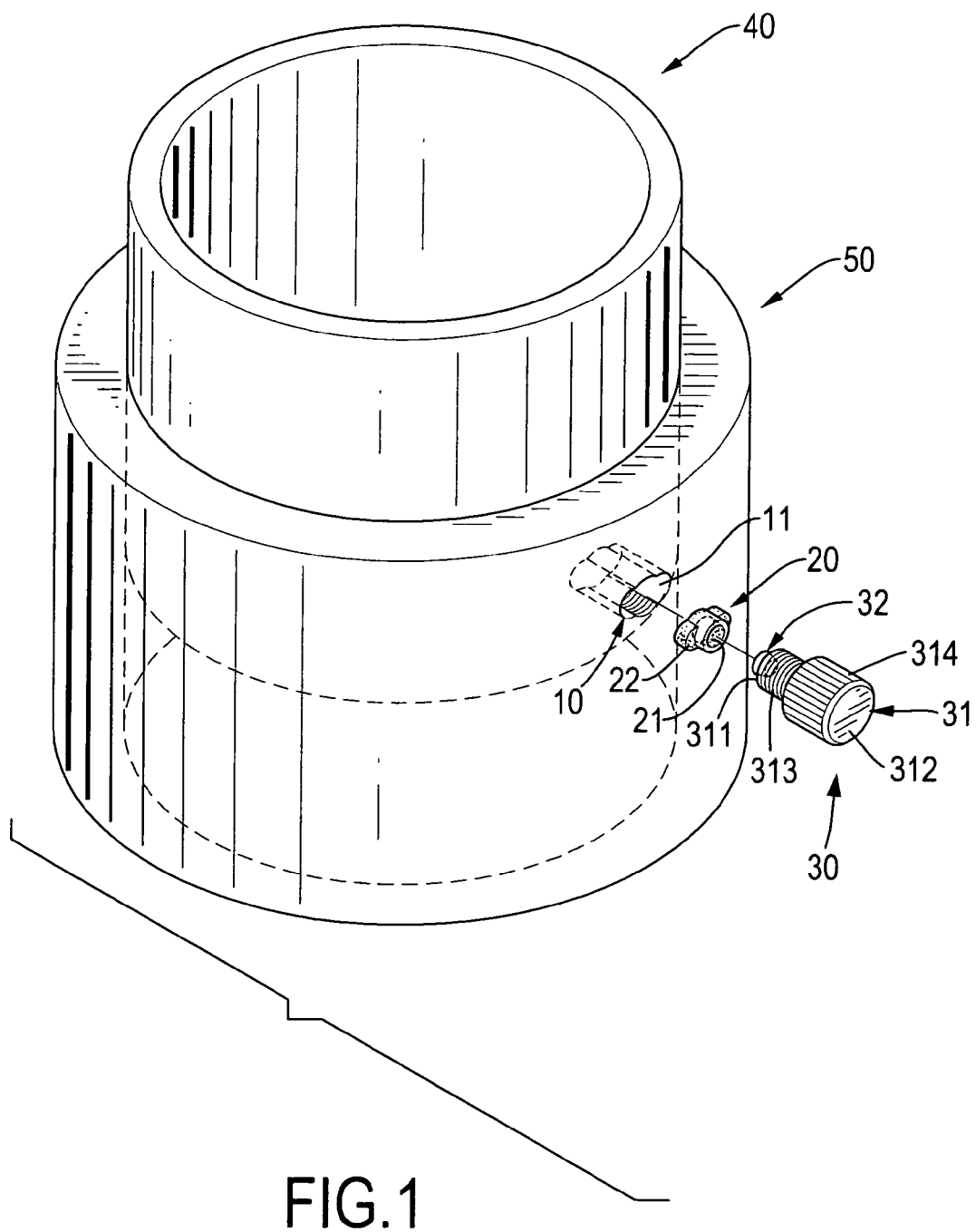
FIG. 1 is an exploded perspective view of a pipework with a fastening device in accordance with the present invention.

With reference to FIGS. 1 and 4 to 7, a pipework in accordance with the present invention for comprises an outer pipe (50), an inner pipe (40), a position hole (10), a pressing element (20) and a bolt (30).

The outer pipe (50) has an outer wall.

The inner pipe (40) is slidably mounted in the outer pipe (50) and has an external surface.

The position hole (10) is formed radially through the outer wall of the outer pipe (50) and has an inner surface, an inner thread and at least one locating slot (11). The inner thread is formed on the inner surface of the position hole (10). The at least one locating slot (11) is formed radially through the outer wall of the outer pipe (50) and communicates with the position hole (10).

The pressing element (20) is made of a flexible material, is mounted in the position hole (10), contacts with the external surface of the inner pipe (40) and has a center, an external surface, a mounting recess (21) and at least one locating block (22, 22A, 22B). The mounting recess (21) is formed in the center of the pressing element (20) and may be conical. The at least one locating block (22, 22A, 22B) may be curved or square, is formed on and protrudes from the external surface of the pressing element (20) and is mounted respectively in the at least one locating slot (11) of the position hole (10).

Figure 6:
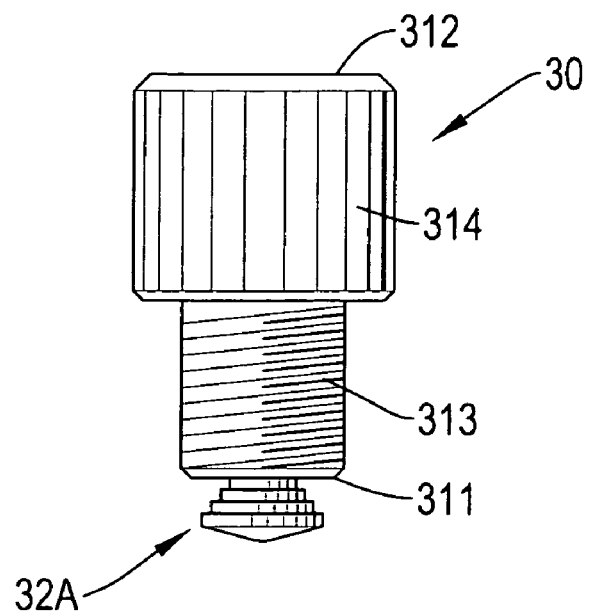
FIG. 6 is a side view of a second embodiment of a bolt of a fastening device in accordance with the present invention.
Figure 7:
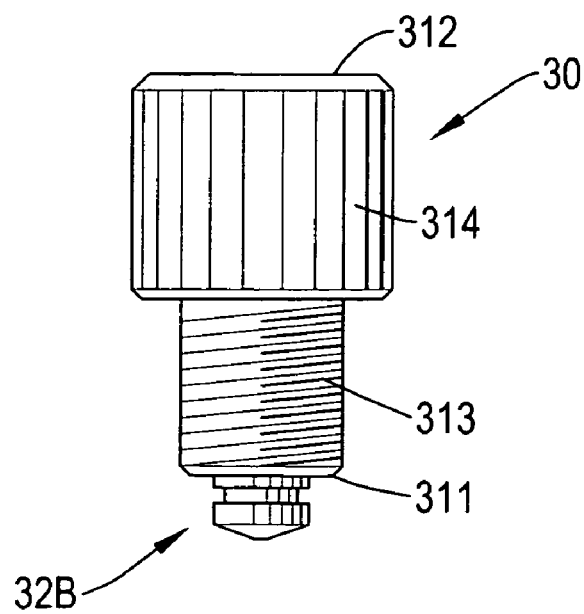
FIG. 7 is a side view of a third embodiment of a bolt of a fastening device in accordance with the present invention.
Figure 8:
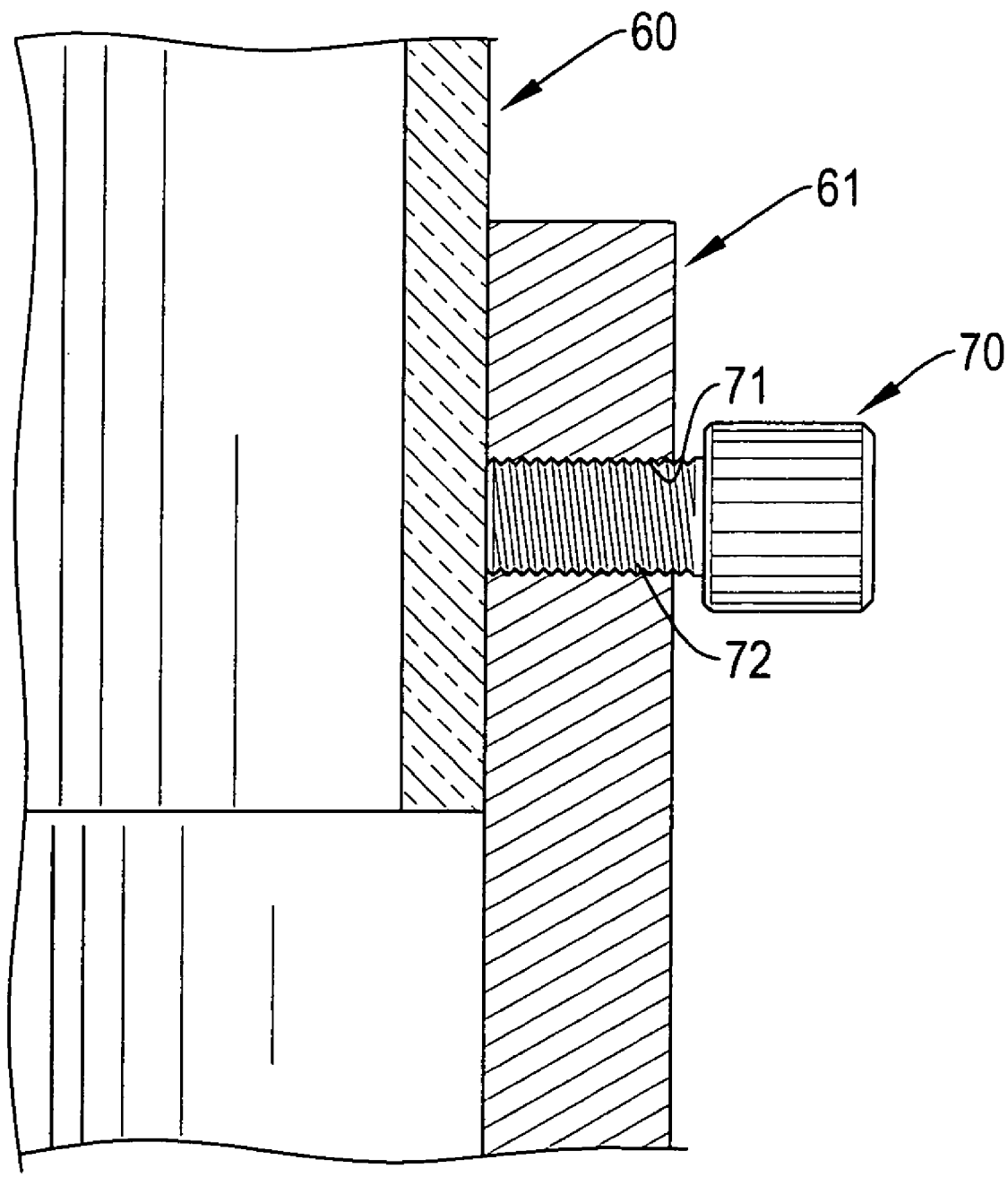
FIG. 8 is a side view in partial section of a conventional fastening device in accordance with the prior art being mounted on a pipework.

The bolt (30) is connected to the pressing element (20), is screwed with the position hole (10) and has a body (31) and a mounting head (32, 32A, 32B). The body (31) is mounted in the position hole (10) and has a mounting segment (311) and an operating segment (312). The mounting segment (311) of the body (31) is mounted in the position hole (10) and has a free end, an external surface and an outer thread (313). The outer thread (313) is formed around the external surface of the mounting segment (311) and is screwed with the inner thread of the position hole (10). The operating segment (312) of the body (31) is formed on the mounting segment (311) and has an external surface and multiple nicks (314). The nicks (314) are formed around the external surface of the operating segment (312) and make turning the body (31) of the bolt (30) easy. The mounting head (32, 32A, 32B) is formed on the free end of the mounting segment (311) of the body (31), is mounted rotatably in the mounting recess (21) of the pressing element (20) and may be spherical, multi-leveled as shown in FIG. 6 or conical as shown in FIG. 7.

Figure 2:
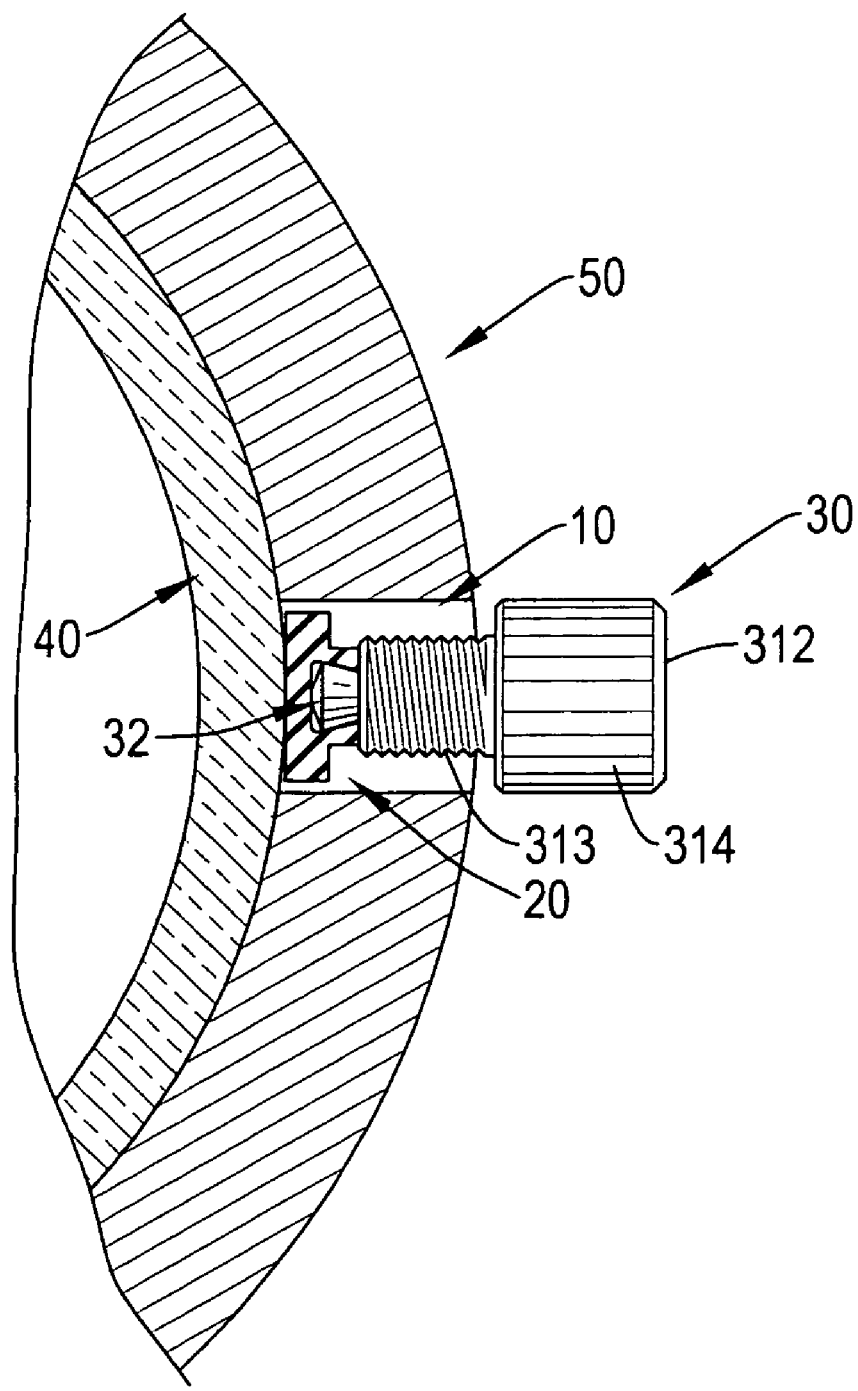
FIG. 2 is a top view in partial section of the pipework with the fastening device in FIG. 1.
Figure 3:
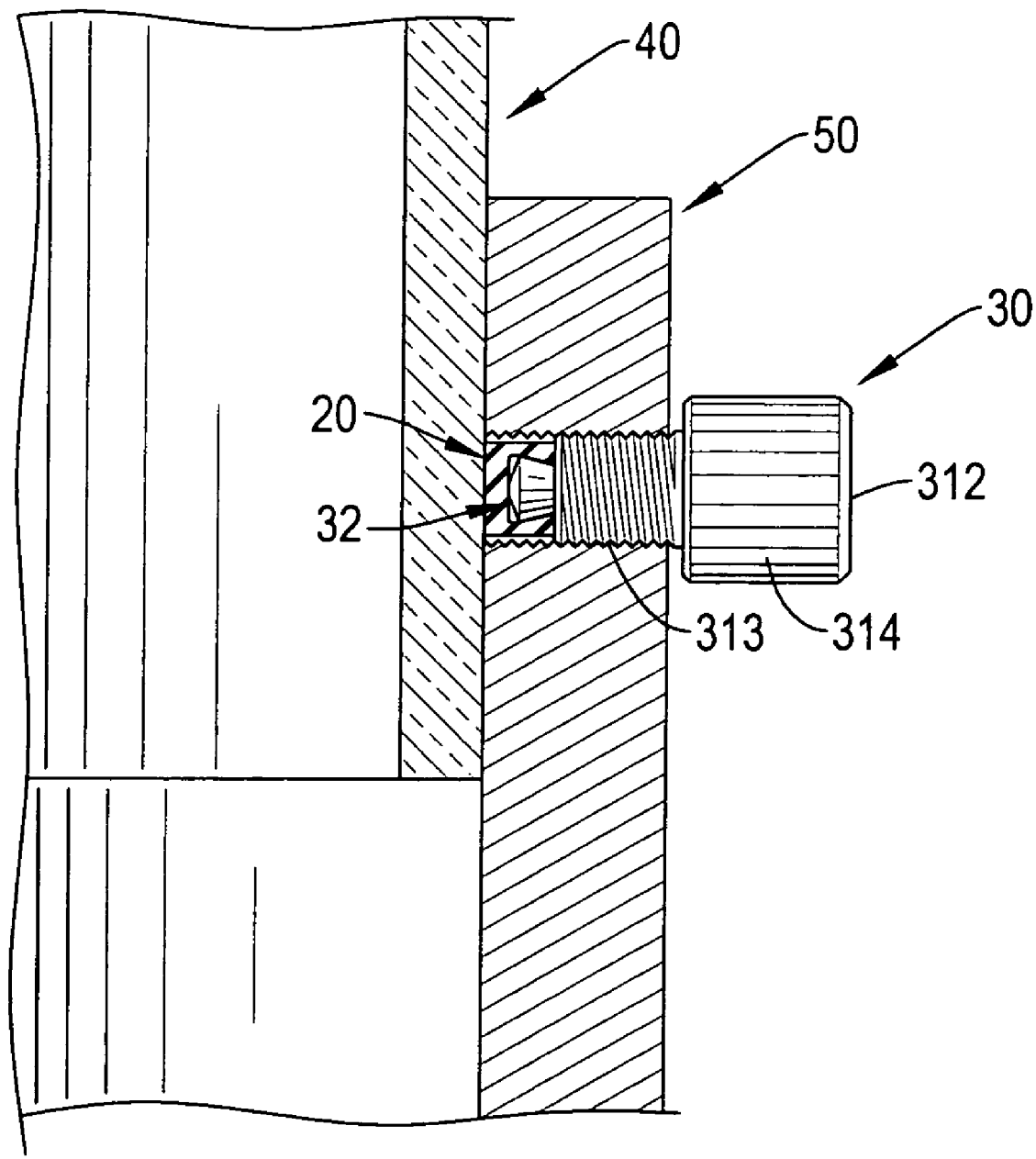
FIG. 3 is a side view in partial section of the pipework with the fastening device in FIG. 1.
Figure 4:
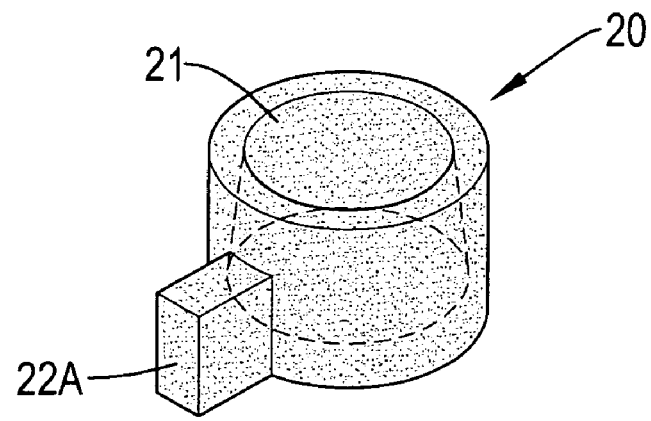
FIG. 4 is a perspective view of a second embodiment of a pressing element of a fastening device in accordance with the present invention.
Figure 5:
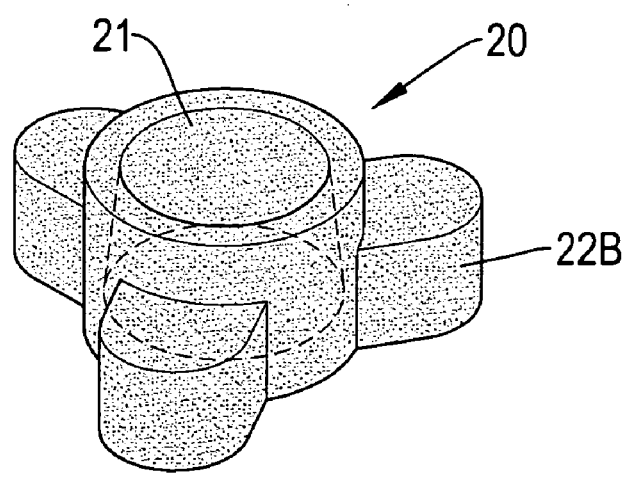
FIG. 5 is a perspective view of a third embodiment of a pressing element of a fastening device in accordance with the present invention.

The fastening device for a pipework is used to hold the inner pipe (40) at a position relative to the outer pipe (50). With reference to FIGS. 2 and 3, the pressing element (20) is put into the position hole (10) and the at least one locating block (22, 22A, 22B) is held respectively in the at least one locating slot (11). The bolt (30) is screwed into the position hole (10) to make the mounting head (32, 32A, 32B) being inserted into the mounting recess (21) in the pressing element (20), and the pressing element (20) is squeezed between the mounting head (32, 32A, 32B) and the external surface of the inner pipe (40). With the abutment of the pressing element

(20) against the external surface of the inner pipe (40), the inner pipe (40) can be held securely at a position relative to the outer pipe (50).

The pipework as described has the following advantages.

1. The inner pipe (40) can be held at a position relative to the outer pipe (50) securely by the bolt (30) in cooperation with the pressing element (20).

2. With the flexible pressing element, the external surface of the inner pipe (40) can be kept from be damaged. Accordingly, the pipework with the fastening device has a prolonged useful life, and the cost of using the pipework is reduced.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pipework having
   an outer pipe having an outer wall;
   an inner pipe being slidably mounted in the outer pipe and having an external surface;
   a position hole being formed radially through the outer wall of the outer pipe and having
      an inner surface;
      an inner thread being formed on the inner surface of the position hole; and
      at least one locating slot being formed radially through the outer wall of the outer pipe and communicating with the position hole;
   a pressing element being made of a flexible material and being mounted in the position hole, contacting with the external surface of the inner pipe and having
      a center;
      an external surface;
      a mounting recess being formed in the center of the pressing element; and
      at least one locating block being formed on and protruding from the external surface of the pressing element and being mounted respectively in the at least one locating slot of the position hole; and
   a bolt being connected to the pressing element, being screwed with the position hole and having
      a body being mounted in the position hole and having
         a mounting segment being mounted in the position hole and having
            a free end;
            an external surface; and
            an outer thread being formed around the external surface of the mounting segment and being screwed with the inner thread of the position hole; and
         an operating segment being formed on the mounting segment; and
      a mounting head being formed on the free end of the mounting segment of the body and being mounted rotatably in the mounting recess of the pressing element.

2. The pipework as claimed in claim 1, wherein
   the position hole has two locating slots formed radially through the outer wall of the outer pipe; and
   the pressing element has two locating blocks formed on and protruding from the external surface of the pressing element and mounted respectively in the locating slots of the position hole.

3. The pipework as claimed in claim 2, wherein the operating segment further has
   an external surface; and
   multiple nicks being formed around the external surface of the operating segment.

4. The pipework as claimed in claim 3, wherein the mounting recess of the pressing element is conical.

5. The pipework as claimed in claim 4, wherein each locating block is curved.

6. The pipework as claimed in claim 4, wherein each locating block is square.

7. The pipework as claimed in claim 4, wherein the mounting head is spherical.

8. The pipework as claimed in claim 4, wherein the mounting head is multi-leveled.

9. The pipework as claimed in claim 4, wherein the mounting head is conical.

* * * * *